April 15, 1941.   P. G. CHACE   2,238,034

METHOD OF MANUFACTURING COMPOSITE THERMOSTATIC METAL

Filed Aug. 27, 1938   2 Sheets-Sheet 1

Paul F. Chace,
Inventor,
Haynes, Koenig and Wolf,
Attorneys.

April 15, 1941.  P. G. CHACE  2,238,034
METHOD OF MANUFACTURING COMPOSITE THERMOSTATIC METAL
Filed Aug. 27, 1938   2 Sheets-Sheet 2
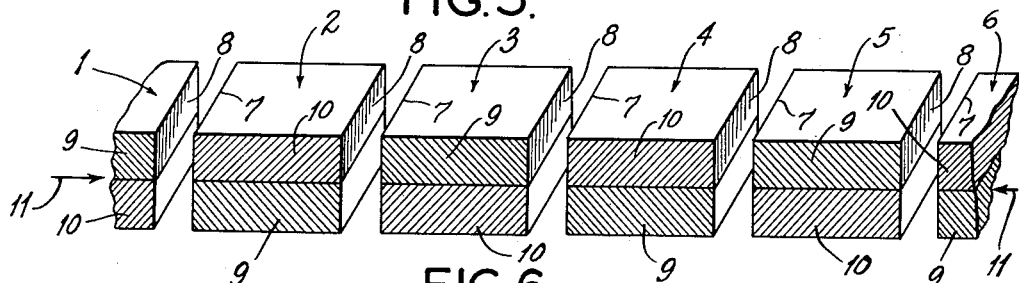
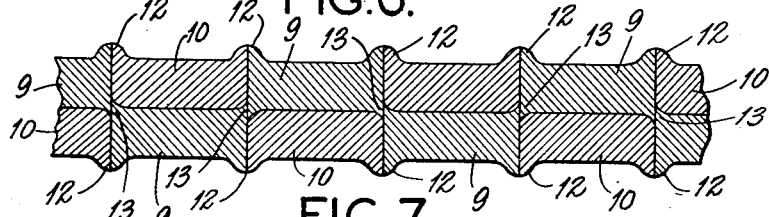
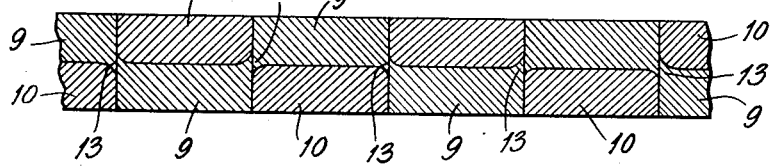
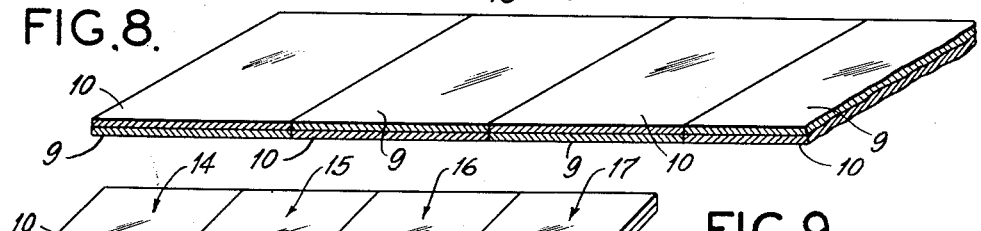
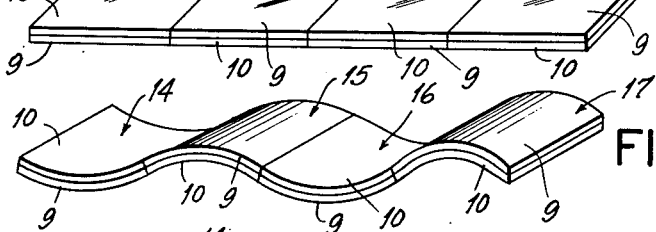
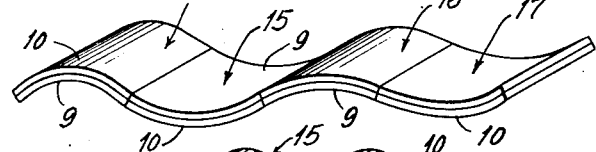
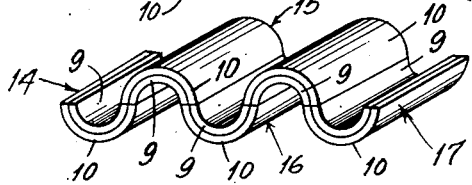

Patented Apr. 15, 1941

2,238,034

UNITED STATES PATENT OFFICE 2,238,034

METHOD OF MANUFACTURING COMPOSITE THERMOSTATIC METAL

Paul G. Chace, Attleboro Falls, Mass., assignor to Metals & Controls Corporation, Attleboro, Mass., a corporation of Massachusetts Application August 27, 1938, Serial No. 227,184

6 Claims. (Cl. 29—189)

This invention relates to methods of manufacturing thermostatic metal, and with regard to certain more specific features, to methods of manufacturing thermostatic metal in unusually long lengths.

Among the several objects of the invention may be noted the provision of a method of manufacturing ordinary composite thermostatic metal in sheets or strips of a length heretofore never achieved; the provision of a method of the class described which commences with composite metal ingots of substantially standard size, and combines these ingots, lengthwise, in such a manner that the joints between adjacent ingots are without impairment on the properties of the finished thermostatic metal; the provision of a method of manufacturing composite thermostatic metal in which the excessive cost incident to the rolling of individually small composite metal ingots is minimized by the expedient of providing lengthy ingots, made up from a plurality of relatively small ingots welded together, whereby, in a single set of rolling operations, a much greater length of finished composite thermostatic metal may be manufactured; the provision of a method of welding together composite thermostatic metal ingots in such manner that the temperature response characteristics of the metal rolled from the composite ingot do not suffer across the regions of the welded joints; the provision of a method of manufacturing thermostatic metal which is of particular application to an unusual form of thermostatic metal in which the component metals alternate in their disposition across the cross section of the metal, from time to time, along the length of the metal; and the provision of an improved product thermostatic metal of the last-named type; and the provision of a method of manufacturing composite thermostatic metal of the class described which provides said metal in sheets of substantially uniform thickness, hardness, and strength, across the entire area of the sheets, and which is relatively economical and simple to carry out. Other objects will be in part obvious and in part pointed out hereinafter.

The invention accordingly comprises the elements and combinations of elements, steps and sequence of steps, features of construction, and arrangements of parts, which will be exemplified in the structures and methods hereinafter described, the scope of the application of which will be indicated in the following claims.

In the accompanying drawings, in which are illustrated several of various possible embodiments of the invention, Fig. 1 is an isometric view showing assembly of ingot blocks ready for a series of welding operations;

Fig. 5 is an isometric view, partly in section, showing an assembly of ingot blocks ready for a series of welding operations in order to make a particular form of thermostatic metal;

Fig. 6 is a cross section of the blocks of Fig. 5 after the welding operations, and constitutes a cross section of a multiple ingot;

Fig. 7 is a cross section similar to Fig. 6, showing the multiple ingot after a surfacing operation;

Fig. 8 is an isometric view, partly in section, showing the product thermostatic metal resulting from the operations illustrated by Figures 5, 6, and 7;

Fig. 9 is an isometric view of a thermostatic element made from the metal of Fig. 8;

Figures 10 and 11 are isometric views of the thermostatic element of Fig. 9, after certain changes of temperature; and, Fig. 12 is an isometric view of another thermostatic element made from the thermostatic metal of Fig. 9.

Similar reference characters indicate corresponding parts throughout the several views of the drawings.

Figure 1:
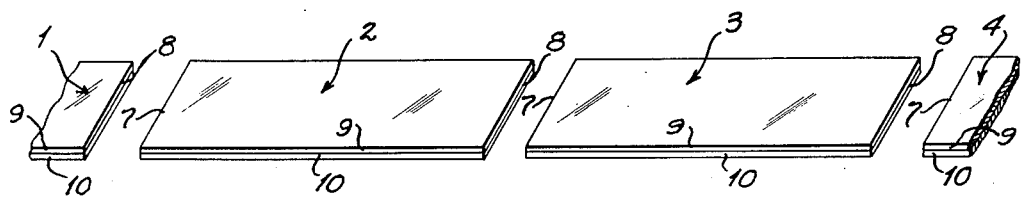

Referring now more particularly to Fig. 1, numerals 1, 2, 3, and 4 indicate a series of composite metal blocks each having parallel ends 7 and 8. Each of the blocks 1, 2, 3, and 4 individually comprises a pair of layers 9 and 10. The metal of layer 9, in each of the blocks, is a metal having a relatively high thermal coefficient of expansion, such as 22% nickel, 3% chromium steel, or brass. The metal of layer 10, in each of these blocks, is a metal having a relatively low thermal coefficient of expansion, such as invar, or 42% nickel steel.

The blocks 1, 2, 3, and 4 of Fig. 1 are representative of ingot blocks as they have long been made for the subsequent manufacture of thermostatic bimetal. The process by which these ingot blocks are made, which forms no part of the present invention, usually comprises a soldering operation, or a pressure welding process, whereby the two layers 9 and 10 are joined together. Due to the nature of the available methods of jointure, the size, in respect of the length and width, of the ingot blocks, is quite limited from the practical standpoint.

It has heretofore been the custom to manufacture thermostatic metal by individually rolling in a separate series of operations each of the ingot blocks 1, 2, 3, and 4 of Fig. 1. Because of the limitation on the size of the ingot blocks discussed above, the ultimate strips or sheets of thermostatic metal have likewise been of restricted size. Furthermore, the expense of the rolling operations by which these ingot blocks are transformed into the relatively thin thermostatic metal has been unduly large, because a separate series of rolling operations, with its consequent personal attention, had to be given to each of the individual ingot blocks.

The present invention, recognizing the inherent impracticability of preparing individual ingot blocks such as 1, 2, 3, and 4 in any large size, proceeds upon the discovery that, prior to rolling, these ingot blocks 1, 2, 3, and 4 can satisfactorily be welded together, end-to-end or side-to-side, in order to make a combined or multiple ingot of much greater length, or width, as may be desired. It will be understood, of course, that the selection of four ingot blocks to be welded together in Fig. 1 is entirely arbitrary, and that the invention applies to any plurality of ingot blocks, up to a number so great as to produce, in the finished metal, a substantially endless strip. Furthermore, while the present invention will be described principally in relation to the welding in end-to-end relationship of the individual ingot blocks, it will clearly be understood that it likewise applies to the welding of such ingot blocks in side-by-side relationship, in case the desideratum is a wider, rather than a longer, finished sheet of bimetal.

A particular feature of the present invention is the nature of the welding operation employed to join the ingot blocks. The operation in question, which may be designated as "flash" welding, is carried out in the following manner:

The ends 7 and 8 of the blocks 1, 2, 3, and 4 are first made flat and optionally suitably cleaned. Any two blocks are then selected, and mounted in clamping devices that hold the pair of blocks in a single planar relationship, with their respective ends to be joined just barely touching. An electric current is then passed through the blocks in serial manner, and the voltage and current is such that an arc, or flash, is commenced between the ends to be welded. The temperature of the arc melts the metals at the ends of the blocks, and in reality burns off a portion of the metal from the end of each block. The arc and consequent burning off of metal is continued until sufficient metal has burned off to bring the temperature of the ends high enough so that when pressure is applied the metal is fluid enough to let the oxidized surfaces on the ends flow outward, thus leaving clean surfaces in contact. The current is then cut off and the two blocks forced together, the melted end regions joining in a perfect, clean weld or fusion. This entire welding operation, it will be understood, rarely takes more than a few seconds.

By this "flash" welding method, the joint is made between surfaces that are completely cleaned (by the flowing of the metals and upsetting), and because the actual uniting is done at a high temperature, the resulting weld or joint is extremely clean, because of the outward flow of the oxide-carrying metal, and strong, because of the perfect fusion.

The two blocks thus welded together are then welded to a third block, or to another pair of two blocks already welded together, and so on until the entire collection of blocks has been joined. In general, it is preferable not to attempt more than one welding operation at any one time, but to assemble the blocks, as many as may be desired, in a series of single-weld operations.

Figure 2:
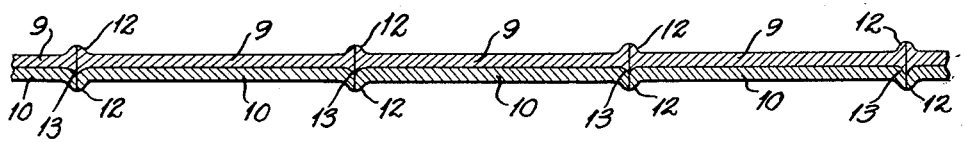
Fig. 2 is a cross section of the blocks of Fig. 1 after the welding operations, and constitutes a cross section of a multiple ingot.

As a consequence of the pressure of the final step of the "flash" welding operation, metal containing the oxide will protrude out somewhat from each of the welded regions as explained above, the protrusions being indicated, for example, by numeral 12 in Fig. 2. Further, by reason of the extreme temperature to which the metal has been subjected, the metal in the regions of protrusions 12 is in a highly annealed condition, and almost of the character of cast metal. Furthermore, by reason of the pressure and the different relative hardnesses of the two different metals 9 and 10, there may be a tendency for the harder metal to push the softer metal somewhat aside in the central region of each of the welds, giving a configuration such as that indicated by numeral 13 in Fig. 2, providing that the two ingot blocks were properly lined up during the welding. This configuration is not serious enough in extent to interfere with the proper action of the material as a thermostat, as explained more in detail hereinafter, and it is even possible that it tends to increase the strength of the resulting sheet metal.

The composite structure as thus formed may be termed a multiple ingot for the manufacture of thermostatic metal in accordance with the present invention, and it will accordingly be so termed hereinafter.

The next procedure in connection with the present invention comprises removing the protrusions 12 from the multiple ingot. This may be done by milling, filling, or any other suitable operation. This is continued until the top and bottom surfaces of the ingots are smooth and parallel, as indicated, for example, in Fig. 3.

Figure 3:
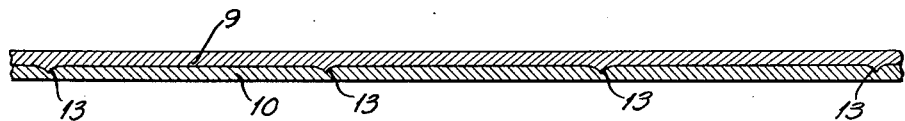
Fig. 3 is a cross section similar to Fig. 2, showing the multiple ingot after a surfacing operation.
Figure 4:
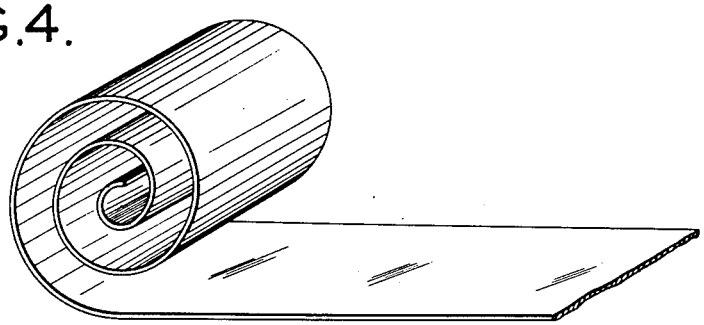
Fig. 4 is an isometric view showing an exemplary form of thermostatic metal made in accordance with the present invention.

The multiple ingot in its Fig. 3 form is now reduced in thickness to the desired final thermostatic metal thickness, by repeated alternating annealings and rollings. Fig. 4, for example, shows a thermostatic metal thus obtained.

The excessive hardness or over-annealed condition, of the metal in the regions of the welds will, however, have been completely corrected by the multiple annealing and rolling operations applied in bringing the ingot to its final thickness. The thermostatic metal of Fig. 4 is accordingly of uniform thickness, hardness, and strength across its entire area, and of substantially unlimited length.

The welding operation described has been carried out with complete satisfaction with composite metals made up as follows, among others:

(1) chrome-nickel steel on nickel steel, such as
    (a) 22% nickel, 3% chromium steel on invar.
    (b) 22% nickel, 3% chromium steel on 42% nickel steel.
    (c) 22% nickel, 3% chromium steel on 45% nickel steel.
    (d) 22% nickel, 3% chromium steel on 50% nickel steel.
(2) brass on invar.
(3) copper on invar.

The invention is, however, by no means limited to these particular bimetals, but is apparently useful with substantially all bimetals.

The method of the present invention is of particular utility in connection with the manufacture of a peculiar form of thermostatic metal in which the component layers of metal alternate, or change their relative position, from time to time along the length of the thermostatic sheet. The application of the invention to this form of thermostatic metal is illustrated in Figures 5 through 8, to which attention is now directed.

Referring now more particularly to Fig. 5, which represents a stage of manufacture similar to that of Fig. 1, it will be seen that six composite ingot blocks 1, 2, 3, 4, 5, and 6 are provided, instead of four as in the Fig. 1 embodiment. Again the number of ingot blocks is entirely arbitrary. By reference to Fig. 5, it will be noted that the relative positions of the metal layers 9 and 10 alternate from block to block. In other words, in blocks 1, 3, and 5, the metal layer 9 is at the top, while the metal layer 10 is at the bottom, while in blocks 2, 4, and 6, metal layer 10 is at the top while the metal layer 9 is at the bottom. Carrying out the successive individual welds described above in connection with the Fig. 1 embodiment, the multiple ingot pictured in Fig. 6 is obtained. In this ingot, the regions indicated at numeral 13 provide narrow portions or welds of like-to-like metal, in this instance being pictured as the metal of layers 9. These like-to-like metal portions in certain instances increase the strength of the welds.

After the protrusions 12 are machined off or otherwise removed, the multiple ingot appears as in Fig. 7, and after the subsequent annealing and rolling operations, the product thermostatic metal appears as in Fig. 8. A characteristic feature of the sheet metal of the present embodiment, as shown in Fig. 8, is that the areas of different metal alternate in the opposite sense across the opposite faces of the metal of the sheet. This means, for example, that wherever on the top surface of the sheet there is a region of metal having a high thermal coefficient of expansion, the coextensive region on the bottom surface of the sheet is a metal having a low thermal coefficient of expansion, and vice versa.

By reason of this alternation of component metals, a thermostat made from the metal of the present embodiment exhibits some unusual characteristics. For example, Fig. 9 shows a strip thermostat that has been cut from the metal of Fig. 8, crosswise thereof, in order to provide a plurality of adjacent regions of alternate metals. The thermostat of Fig. 9 is shown as having four such regions, designated by numerals 14, 15, 16, and 17, although it will be understood that the strip may contain, along its length, any other given plurality of regions. In the regions 14 and 16, for example, the metal of a high thermal coefficient of expansion is on the top, while the metal of a low thermal coefficient of expansion is on the bottom; in the regions 15 and 17, on the contrary, the metal of low thermal coefficient of expansion is on the top while the metal of high thermal coefficient of expansion is on the bottom. At a given predetermined temperature, the thermostat of Fig. 9 is pre-formed to be flat, as illustrated.

If the ambient temperature now drops from said given predetermined temperature, the thermostatic strip of Fig. 9 will assume a configuration similar to that shown in Fig. 10. This is because each of the regions 14, 15, 16, and 17 will tend to curl, becoming concave on the metal surface where the metal of high thermal coefficient of expansion is located. The assumption by the strip of the wave-like conformation of Fig. 10 means that said strip will shorten its overall length, and this shortening may be used, with suitable mounting means, to achieve any desired useful effect.

If, on the contrary, the temperature rises from its aforesaid predetermined value, the thermostatic strip of Fig. 9, instead of assuming the Fig. 10 conformation, will assume the Fig. 11 conformation. In the Fig. 11 conformation each of the individual regions 14, 15, 16, and 17 has again undergone curvature, but in this instance the curvature is such that the side of the region having the metal of relatively high thermal coefficient of expansion is convex, instead of concave as in the Fig. 10 configuration. However, it will quickly be seen that the net effect on the overall length of the strip is substantially the same with both the Fig. 10 and the Fig. 11 configurations. That is to say, if the temperature varies in either direction from the temperature at which the piece is flat, the thermostat undergoes shortening, and this peculiar characteristic may be made use of to motivate controls of numerous different types.

If a strip of composite metal of the type shown in Fig. 9 is corrugated with the corrugations extending across the width of the strip, parallel to the direction of the weld lines, a thermostatic element of the type shown in Fig. 12 is obtained. Preferably, the spacing of the corrugations is made such that a weld occurs half-way between each bend or loop forming the corrugation, although it is not necessary that the welded region in each instance come exactly half-way between the loops, as shown in Fig. 12. When a corrugated strip of the type shown in Fig. 12 is subjected to temperature changes, it will expand or contract in a direction parallel to its length. For instance, if the high expansion metal is on the outside of each of the bends forming the corrugations, the thermostat contracts upon rise of temperature, and expands upon drop of temperature. If the strip is so formed that the high expansion metal occurs on the insides of the bends forming the corrugation, the strips will expand on rise of temperature and contract on drop of temperature.

While the invention has been described, and in point of fact finds its chief utility, in the form of a composite sheet metal having but two layers, it will readily be seen that it likewise applies to composite sheets having three or more layers, and furthermore to sheets of metal which have varying compositional characteristics of non-discrete character throughout the thickness of the sheet, such as the metal disclosed in Vannevar Bush Patent 1,870,235, granted August 9, 1932, for example.

The "flash"-welding operation as described is much to be preferred in joining composite thermostatic metal ingot blocks. Butt-welding differs from "flash" welding in that in the former, the current is passed through abutting ingots until the edges become viscous, and then the ingots are forced together. No arc or flash takes place. One inferiority of butt-welding with respect to "flash" welding is that in the former the surfaces to be joined are not freed of oxides during the pressure application, and as a result surface oxides are frequently occluded within the welded joint, thus weakening it.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

I claim:

1. The method of manufacturing composite thermostatic metal, which comprises preparing a plurality of ingot blocks each of a composite character, aligning two of said blocks in end-to-end relationship with the blocks barely touching each other, passing an intense electric current through said aligned blocks, permitting the current to flow long enough to melt and burn off at least some metal from each end, and then forcibly bringing the two blocks together in end-to-end, firm, contact, with the metals of one ingot fusing into the metals of the other ingot to obtain a clean, strong welded joint, and thereafter removing the protrusions in the regions of the welds, and finally reducing the thickness of the multiple ingot and annealing it in alternating steps until it has the thickness of the desired composite thermostatic metal.

2. The method of manufacturing composite thermostatic metal of the class described which comprises preparing a plurality of blocks each of which has a plurality of layers of different metals, assembling the blocks with adjacent blocks inverted so that different metals appear alternately across the surfaces of the collection of blocks, passing an intense electric current between the edges of selected pairs of blocks so as to melt and burn off the metal therefrom, applying inwardly directed pressure at each end of the said pair of blocks whereby said blocks are welded together to form a composite ingot, repeating the welding operations until all of the blocks are welded together into a multiple ingot, and thereafter reducing said multiple ingot to the desired metal thickness.

3. The method of manufacturing composite thermostatic metal of the class described which comprises preparing a plurality of blocks each of which has a plurality of layers of different metals, assembling the blocks with adjacent blocks inverted so that different metals appear alternately across the surfaces of the collection of blocks, flash-welding together selected pairs of blocks as so assembled until the entire assembly is welded together in order to form a multiple ingot, with projections extending from each surface of the ingot along the weld lines thereon, removing the said projections from the multiple ingot and thereby providing it with smooth, parallel faces, and thereafter reducing said multiple ingot to the desired metal thickness, said flash-welding being accomplished by passing an electric current of proper density through the collection of blocks.

4. The method of manufacturing composite thermostatic metal which comprises aligning two ingot blocks each of a composite character in end-to-end relationship with the blocks barely touching each other, passing an intense electric current through said aligned blocks, permitting the current to flow long enough to melt and burn off at least some metal at each end, and then forcibly bringing the two blocks together in end-to-end, firm contact, with the metals of one ingot fusing into the metals of the other ingot to obtain a clean, strong welded joint, and thereafter removing the protrusions in the regions of the welds and finally reducing the thickness of the multiple ingot and annealing it in alternating steps until it has the thickness of the desired composite thermostatic metal.

5. The method of manufacturing composite thermostatic metal of the class described which comprises assembling a plurality of blocks each of which has a plurality of layers of different metals with adjacent blocks inverted so that different metals appear alternately across the surfaces of the collection of blocks, passing an intense electric current between the edges of selected pairs of blocks so as to melt and burn off the metal therefrom, applying inwardly directed pressure at each end of the said pair of blocks, whereby said blocks are welded together to form a composite ingot, repeating the welding operations until all of the blocks are welded together into a multiple ingot, and thereafter reducing said multiple ingot to the desired metal thickness.

6. The method of manufacturing composite thermostatic metal of the class described which comprises assembling a plurality of blocks, each of which has a plurality of layers of different metals, with adjacent blocks inverted so that different metals appear alternately across the surfaces of the collection of blocks, flash-welding together selected pairs of blocks as so assembled until the entire assembly is welded together in order to form a multiple ingot with projections extending from each surface of the ingot along the weld lines thereon, removing the said projections from the multiple ingot and thereby providing it with smooth, parallel faces, and thereafter reducing said multiple ingot to the desired metal thickness, said flash-welding being accomplished by passing an electric current of proper density through the collection of blocks.

PAUL G. CHACE.